United States Patent
Wu et al.

(10) Patent No.: US 12,430,336 B2
(45) Date of Patent: *Sep. 30, 2025

(54) TRANSPARENT ACCESS TO AN EXTERNAL DATA SOURCE WITHIN A DATA SERVER

(71) Applicant: Kinaxis Inc., Ottawa (CA)

(72) Inventors: Jian Wu, Ottawa (CA); Adrian Petrescu, Ottawa (CA); Hung Nguyen, Ottawa (CA); Yingbei Lu, Ottawa (CA); Harveer Singh, Ottawa (CA); Daniel Lee, Ottawa (CA)

(73) Assignee: Kinaxis Inc., Ottawa (CA)

( * ) Notice: Subject to any disclaimer, the term of this patent is extended or adjusted under 35 U.S.C. 154(b) by 227 days.

This patent is subject to a terminal disclaimer.

(21) Appl. No.: 17/956,362

(22) Filed: Sep. 29, 2022

(65) Prior Publication Data

US 2023/0082128 A1 Mar. 16, 2023

Related U.S. Application Data

(63) Continuation-in-part of application No. 17/943,657, filed on Sep. 13, 2022.

(60) Provisional application No. 63/261,178, filed on Sep. 14, 2021.

(51) Int. Cl.
- *G06F 16/00* (2019.01)
- *G06F 16/22* (2019.01)
- *G06F 16/2453* (2019.01)
- *G06F 16/2455* (2019.01)

(52) U.S. Cl.
CPC .... *G06F 16/24552* (2019.01); *G06F 16/2282* (2019.01); *G06F 16/24534* (2019.01)

(58) Field of Classification Search
CPC .......... G06F 16/24552; G06F 16/2282; G06F 16/24534
USPC .................................................. 707/600–899
See application file for complete search history.

(56) References Cited

U.S. PATENT DOCUMENTS

| | | | |
|---|---|---|---|
| 7,653,731 | B2 | 1/2010 | Martynov et al. |
| 8,078,652 | B2 | 12/2011 | Basu et al. |
| 9,116,954 | B1 | 8/2015 | Cappiello et al. |
| 9,674,261 | B2 | 6/2017 | Nathan et al. |
| 10,346,375 | B2 | 7/2019 | Chen et al. |
| 11,120,082 | B2 | 9/2021 | Hilloulin et al. |
| 11,514,236 | B1 | 11/2022 | Pedapati |
| 11,663,199 | B1 | 5/2023 | Kiselev et al. |
| 2013/0124957 | A1 | 5/2013 | Oppenheimer et al. |
| 2018/0081947 | A1* | 3/2018 | Kass .................. G06F 16/2456 |

(Continued)

OTHER PUBLICATIONS

U.S. Appl. No. 17/943,657, Final office Action dated Feb. 6, 2024.

(Continued)

*Primary Examiner* — Michelle N Owyang
(74) *Attorney, Agent, or Firm* — Ruggiero McAllister & McMahon LLC

(57) ABSTRACT

Disclosed herein are systems and methods that do not require loading data into memory to perform daily activities of an application. The data from an external source can be accessed externally and utilized (for example, in a workbook or via a dashboard, etc.) the same way as in-memory data. This is useful when an external data set is too large to fit in the memory. In this manner, all the data that is needed can be stored in an external table that may be accessed as needed.

12 Claims, 11 Drawing Sheets

(56) References Cited

U.S. PATENT DOCUMENTS

| | | |
|---|---|---|
| 2019/0026335 A1 | 1/2019 | Gerweck et al. |
| 2019/0102412 A1* | 4/2019 | MacNicol ............. G06F 16/221 |
| 2019/0236203 A1 | 8/2019 | De Boer |
| 2020/0151154 A1* | 5/2020 | Kumar ................. G06F 16/211 |
| 2020/0311063 A1* | 10/2020 | Hariharasubrahmanian ................ G06F 16/24573 |
| 2021/0397626 A1 | 12/2021 | Griffith et al. |

OTHER PUBLICATIONS

U.S. Appl. No. 17/943,657, Non-Final office Action dated Oct. 6, 2023.

* cited by examiner

TRANSPARENT ACCESS TO AN EXTERNAL DATA SOURCE WITHIN A DATA SERVER

CROSS-REFERENCE TO RELATED APPLICATIONS

The present application is a continuation-in-part of U.S. Ser. No. 17/943,657, filed Sep. 13, 2022, which claims the benefit of U.S. Patent Application No. 63/261,178, filed Sep. 14, 2021, both of which are expressly incorporated by reference herein.

BACKGROUND

A data server is inherently limited in the quantity of data it can address in its in-memory engine. In many cases where a system uses an in-memory database, it is impossible to load all data required for performing certain dynamic operations, into memory. For example, a large amount of data may be incoming as a parquet file; such a file cannot be loaded directly into the system as a regular table, since it will exceed the memory capacity of the data server.

In addition to the issue of limited in-memory capacity, systems that use an in-memory database also face challenges integrating incoming data into the in-memory database. A lot of computing resources are required to access data required for in-memory database systems—resources related to memory and data integration.

BRIEF SUMMARY

One approach to address issues related to data volume and data integration is externalization of data, such that it can be available on demand as needed. In addition to externalizing the data, computing resources can be reduced by pushing certain operations to the external database (that holds the external data). By using this approach, it is not necessary to pull an entire data set and then apply various operations on the pulled dataset (operations, for example, such as data filtering, aggregation, join, etc. Instead, such operations can be performed on the external database via a query operation, which then can return a smaller, filtered set of data. For example the query operation can be performed using Structured Query Language (SQL).

Therefore, the extraction that is performed is not a pure data dump extraction. Instead, it is an extraction that can be performed through Open Database Connectivity (ODBC), which allows for adding an operation during the extraction, thereby enhancing the efficiency of the extraction. ODBC is used when a server code uses C++. The extraction can also be performed through a Java implementation of OBD when a Java Virtual Machine (JVM)—backed platform is used.

The present disclosure addresses expansion of the scope of data addressable within a data server context (workbook, chart, etc.) by allowing transparent access to tables stored in one or more external database engines that are accessible over a network. These engines can execute arbitrary aggregations, filters, joins, and so forth, on raw tables before sending the preprocessed results back to the data server to have schema and logic layered on top.

Disclosed herein are systems and methods that do not require loading data into memory to perform daily activities of an application. The data from an external source can be accessed externally and utilized (for example, in a workbook, a chart, or via a dashboard, etc.) the same way as in-memory data. This is useful when an external data set is too large to fit in the memory. In this manner, all the data that is needed can be stored in an external table that may be accessed as needed.

Methods and systems disclosed herein may comprise the following:

a) Viewing an external data directory in a data server. A user can dynamically include the external data in the data server and view the data in a worksheet or any visualization that is provided by the data server.
b) Authoring an external table in the Data Server Data Model. Here, the data source name can be specified and a SQL statement from a data model dialog to leverage a live transform feature. In this way, no server restart is required for data model changes.
c) External data is represented as an external table in the Data Server; any query against this external table can result in an iteration of the external data source retrieved via an Application Programming Interface (API) for accessing a database. An example of such an API interface is Open Database Connectivity (ODBC).
d) Data filtering, aggregation and joins can be performed at the external data source, thereby leveraging external computation power (not bounded by the data server memory and data server CPU).

In one aspect, a computer-implemented method includes: opening; by a processor, a workbook; executing, by the processor, a workbook query, the workbook query having a target table; loading, by the processor, external data from an external data source to a record that is external to an in-memory database, for a target table that is an external table; and loading, by the processor, data from a record block stored in the in-memory database, for a target table that is a regular table.

The computer-implemented method may also include where loading the external data from the external data source includes using, by the processor, an Application Programming Interface for accessing a database.

The computer-implemented method may also include where the external data source is at least one of a public cloud, an external system and an external disk.

The computer-implemented method may also include where executing the workbook query includes opening, by the processor, a worksheet from the workbook, sending, by the processor, a worksheet query to a query engine, executing, by the processor, the worksheet query, and returning, by the processor, one or more query results. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to: open, by the processor, a workbook; execute, by the processor, a workbook query, the workbook query having a target table; load, by the processor, external data from an external data source to a record that is external to an in-memory database, for a target table that is an external table; and load, by the processor, data from a record block stored in the in-memory database, for a target table that is a regular table.

The computing apparatus may also include, when loading the external data from the external data source, memory storing instructions that, when executed by the processor, configure the apparatus to use, by the processor, an Application Programming Interface for accessing a database.

The computing apparatus may also include, where the external data source is at least one of a public cloud, an external system and an external disk.

The computing apparatus may also include, when executing the workbook query, memory storing instructions that, when executed by the processor, configure the apparatus to: open, by the processor, a worksheet from the workbook; send, by the processor, a worksheet query to a query engine; execute, by the processor, the worksheet query; and return, by the processor, one or more query results. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: open, by a processor, a workbook; execute, by the processor, a workbook query, the workbook query having a target table; load, by the processor, external data from an external data source to a record that is external to an in-memory database, for a target table that is an external table; and load, by the processor, data from a record block stored in the in-memory database, for a target table that is a regular table.

Using the computer-readable storage medium, loading the external data from the external data source may include using, by the processor, an Application Programming Interface for accessing a database.

The computer-readable storage medium may also include, where the external data source is at least one of a public cloud, an external system and an external disk.

Using the computer-readable storage medium, executing the workbook query may include: opening, by the processor, a worksheet from the workbook; sending, by the processor, a worksheet query to a query engine; executing, by the processor, the worksheet query; and returning, by the processor, one or more query results. Other technical features may be readily apparent to one skilled in the art from the following figures, descriptions, and claims.

In the computer-implemented method, executing the worksheet query for an external table may include creating, by the processor, an instance of an external data source class. The external table may also include translating, by the processor, the worksheet query into Structured Query Language (SQL) fetching, by the processor, one or more records from the external data source over an API using SQL, filtering, by the processor, results by applying one or more column search expressions, and sending, by the processor, the results to an application server.

The computing apparatus may also include, when executing the worksheet query for an external table, memory storing instructions that, when executed by the processor, configure the apparatus to create, by the processor, an instance of an external data source class. The external table may also include translate, by the processor, the worksheet query into Structured Query Language (SQL) fetch, by the processor, one or more records from the external data source over an API using SQL, filter, by the processor, results by applying one or more column search expressions, and send, by the processor, the results to an application server.

Using the computer-readable storage medium, executing the worksheet query for an external table may include creating, by the processor, an instance of an external data source class. The external table may also include translate, by the processor, the worksheet query into Structured Query Language (SQL) fetch, by the processor, one or more records from the external data source over an API using SQL, filter, by the processor, results by applying one or more column search expressions, and send, by the processor, the results to an application server. Other technical features may be readily apparent to one skilled in the art from the following figures, descriptions, and claims.

In one aspect, a computer-implemented method includes: opening, by a processor, a chart; executing, by the processor, a chart query, the chart query having a target table; loading, by the processor, external data from an external data source to a record that is external to an in-memory database, for a target table that is an external table; and loading, by the processor, data from a record block stored in the in-memory database, for a target table that is a regular table.

In the computer-implemented method, loading the external data from the external data source may include using, by the processor, an Application Programming Interface for accessing a database.

In the computer-implemented method, the external data source may be at least one of a public cloud, an external system and an external disk.

In the computer-implemented method, executing the chart query may include: sending, by the processor, the chart query to the query engine; executing, by the processor, the chart query; and returning, by the processor, one or more query results. Other technical features may be readily apparent to one skilled in the art from the following figures, descriptions, and claims.

The computer-implemented method may also include, when executing the chart query for an external table, creating, by the processor, an instance of an external data source class. The external table may also include translating, by the processor, the chart query into Structured Query Language (SQL) fetching, by the processor, one or more records from the external data source over an API using SQL, filtering, by the processor, results by applying one or more column search expressions, and sending, by the processor, the results to an application server.

In one aspect, a computing apparatus includes a processor. The computing apparatus also includes a memory storing instructions that, when executed by the processor, configure the apparatus to: open, by the processor, a chart; execute, by the processor, a chart query, the chart query having a target table; load, by the processor, external data from an external data source to a record that is external to an in-memory database, for a target table that is an external table; and load, by the processor, data from a record block stored in the in-memory database, for a target table that is a regular table.

The computing apparatus may also include where when loading the external data from the external data source, memory storing instructions that, when executed by the processor, configure the apparatus to use, by the processor, an Application Programming Interface for accessing a database.

Using the computing apparatus, the external data source may be at least one of a public cloud, an external system and an external disk.

The computing apparatus may also include where when executing the chart query, memory storing instructions that, when executed by the processor, configure the apparatus to send, by the processor, the chart query to the query engine, execute, by the processor, the chart query, and return, by the processor, one or more query results. Other technical features may be readily apparent to one skilled in the art from the following figures, descriptions, and claims.

The computing apparatus, when executing the chart query for an external table, may be further configured to create, by the processor, an instance of an external data source class. The external table may also include translate, by the processor, the chart query into Structured Query Language (SQL) fetch, by the processor, one or more records from the external data source over an API using SQL, filter, by the processor, results by applying one or more column search expressions, and send, by the processor, the results to an application server.

In one aspect, a non-transitory computer-readable storage medium is provided, the computer-readable storage medium including instructions that when executed by a computer, cause the computer to: open, by a processor, a chart; execute, by the processor, a chart query, the chart query having a target table; load, by the processor, external data from an external data source to a record that is external to an in-memory database, for a target table that is an external table; and load, by the processor, data from a record block stored in the in-memory database, for a target table that is a regular table.

Using the computer-readable storage medium, loading the external data from the external data source may include using, by the processor, an Application Programming Interface for accessing a database.

Using the computer-readable storage medium, the external data source may be at least one of a public cloud, an external system and an external disk.

The computer-readable storage medium may also include, when executing the chart query, instructions that when executed by the computer, cause the computer to further send, by the processor, the chart query to the query engine, execute by the processor, the chart query, and return, by the processor, one or more query results. Other technical features may be readily apparent to one skilled in the art from the following figures, descriptions, and claims.

The computer-readable storage medium may also include, when executing the chart query for an external table, instructions that when executed by the computer, cause the computer to further create, by the processor, an instance of an external data source class. The external table may also include translate, by the processor, the chart query into Structured Query Language (SQL) fetch, by the processor, one or more records from the external data source over an API using SQL, filter, by the processor, results by applying one or more column search expressions, and send, by the processor, the results to an application server. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

DETAILED DESCRIPTION

Figure 1:
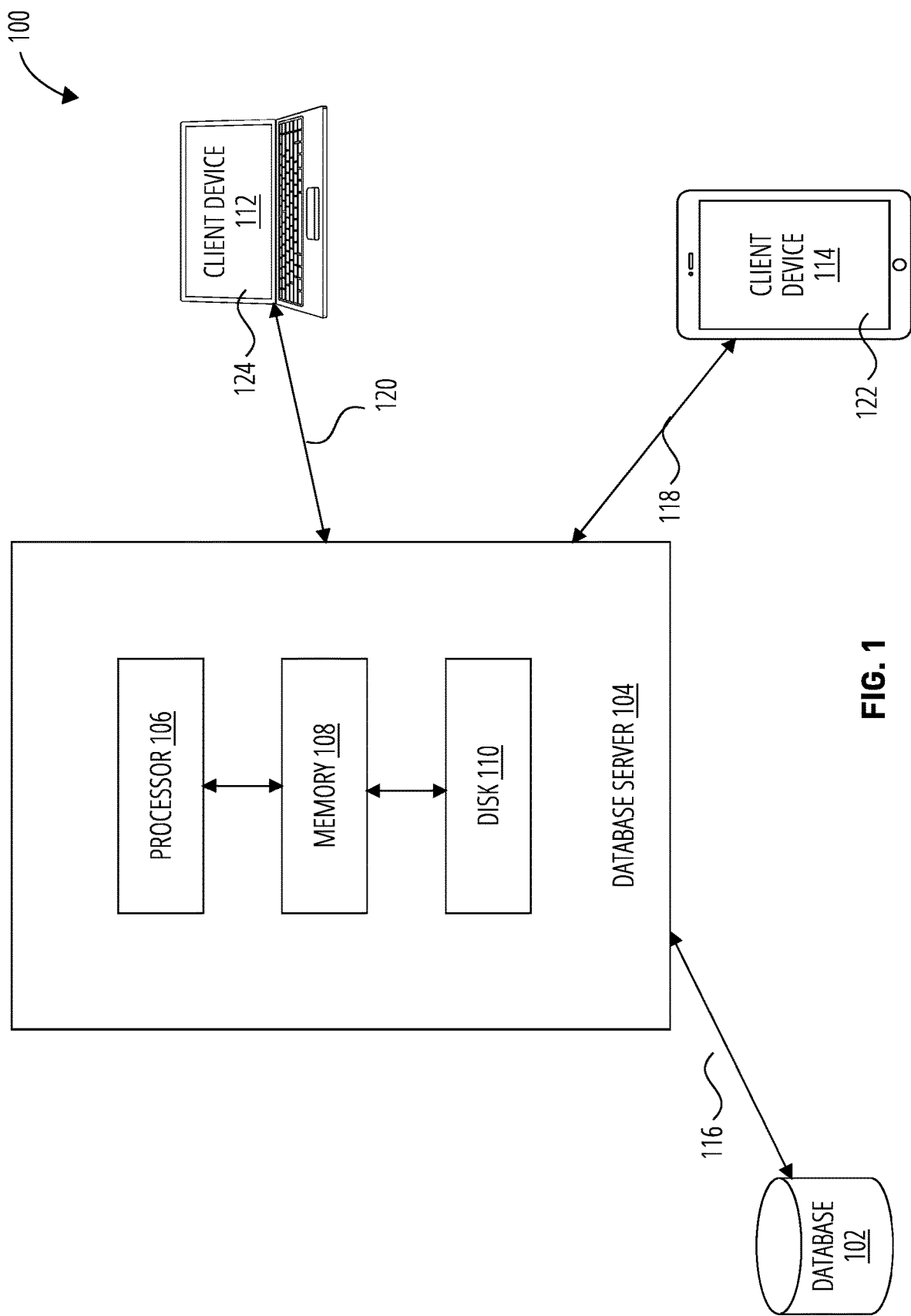
FIG. 1 illustrates an example of a system in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for Transparent Access to an External Data Source within a Data Server.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Figure 2:
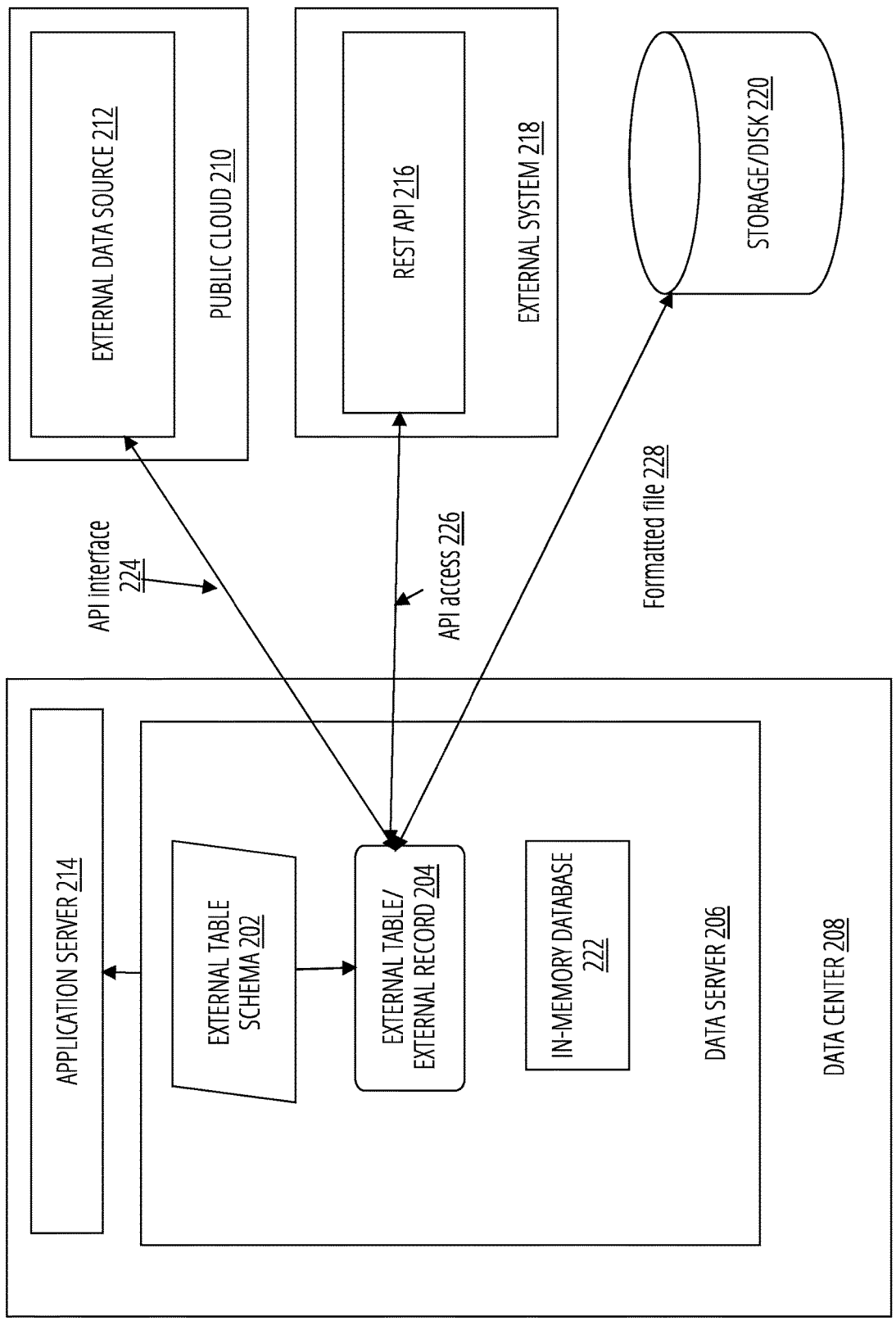
FIG. 2 illustrates a system architecture diagram in accordance with one embodiment.

FIG. 2 illustrates a system architecture diagram in accordance with one embodiment.

Data center 208 comprises a data server 206 and application server 214, with the data server 206 providing information to the application server 214. The data server 206 comprises an external table schema 202 which contributes to External table/external records 204. The data server 206 also comprises an in-memory database 222 which can store regular tables and regular records.

Data center 208 can be in two-way communication with one or more external sources of information. In FIG. 2, data center 208 is shown in two-way communication with three external sources of information: public cloud 210, external system 218 and storage/disk 220. In particular, it is the External table/external records 204 portion of the data center 208 that is in communication with public cloud 210, external system 218 and storage/disk 220.

Public cloud 210 comprises an external data source 212 that can securely communicate with External table/external records 204 via an API interface 224 for accessing a database. An example of an API interface 224 includes ODBC over a secure socket layer. External system 218 comprises a Rest API 216 that can communicate with External table/external records 204 via an API access 226. Storage/disk 220 communicates data with External table/external records 204 using a Formatted file 228. As an example, a parquet file format or flat file format can be used.

While three sources of external information are illustrated (namely public cloud 210, external system 218 and storage/disk 220), it is understood that there can be fewer or more than three. Data is communicated from each external source of information to data center 208 using a suitable data extraction API or similar mechanism.

A query engine (not shown) can handle queries, and can access either data in a regular table (in the in-memory database), or data in the external table, and return a query result. It is during query execution that the external table accesses external data.

Figure 3:
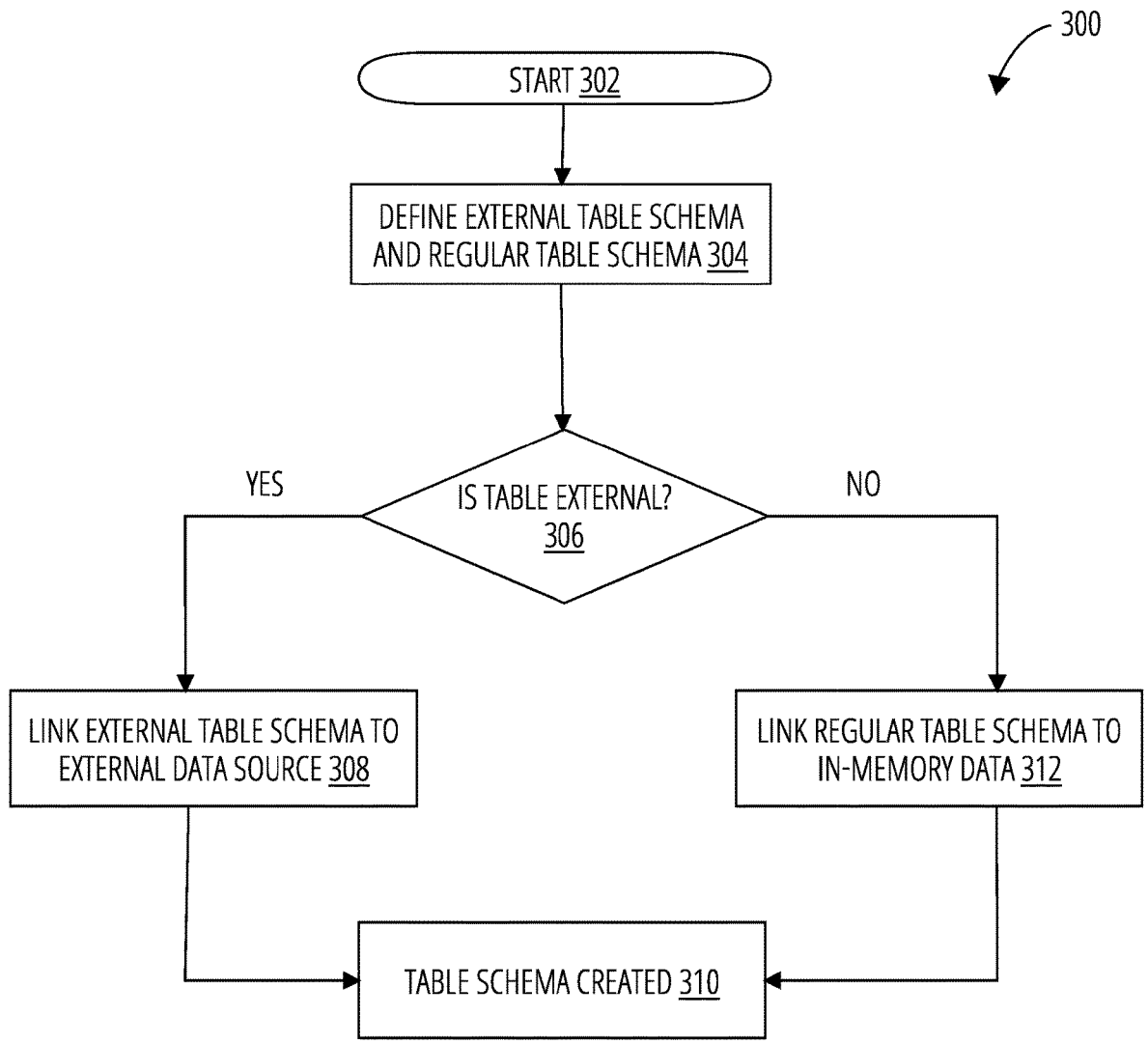
FIG. 3 illustrates a block diagram for provisioning a table schema in accordance with one embodiment.

FIG. 3 illustrates a block diagram 300 for provisioning a table schema in accordance with one embodiment.

An external table schema is defined at block 304, as is a regular table schema.

For an external table ('yes' at decision block 306), the external table schema is linked to an external data source at block 308 (see for example external data source 212 in FIG. 2). The external data source may be a data source accessed by ODBC. If the table is not external ('no' at decision block 306), this means that the table is regular at block 312; a regular table, is stored as a regular table schema. At block 310, table schema (for both external table and regular table) are created in the data server.

From the perspective of a user, an external table behaves like a regular table. That is, from an applications layer, there is no difference between an external table and a regular table.

Figure 4:
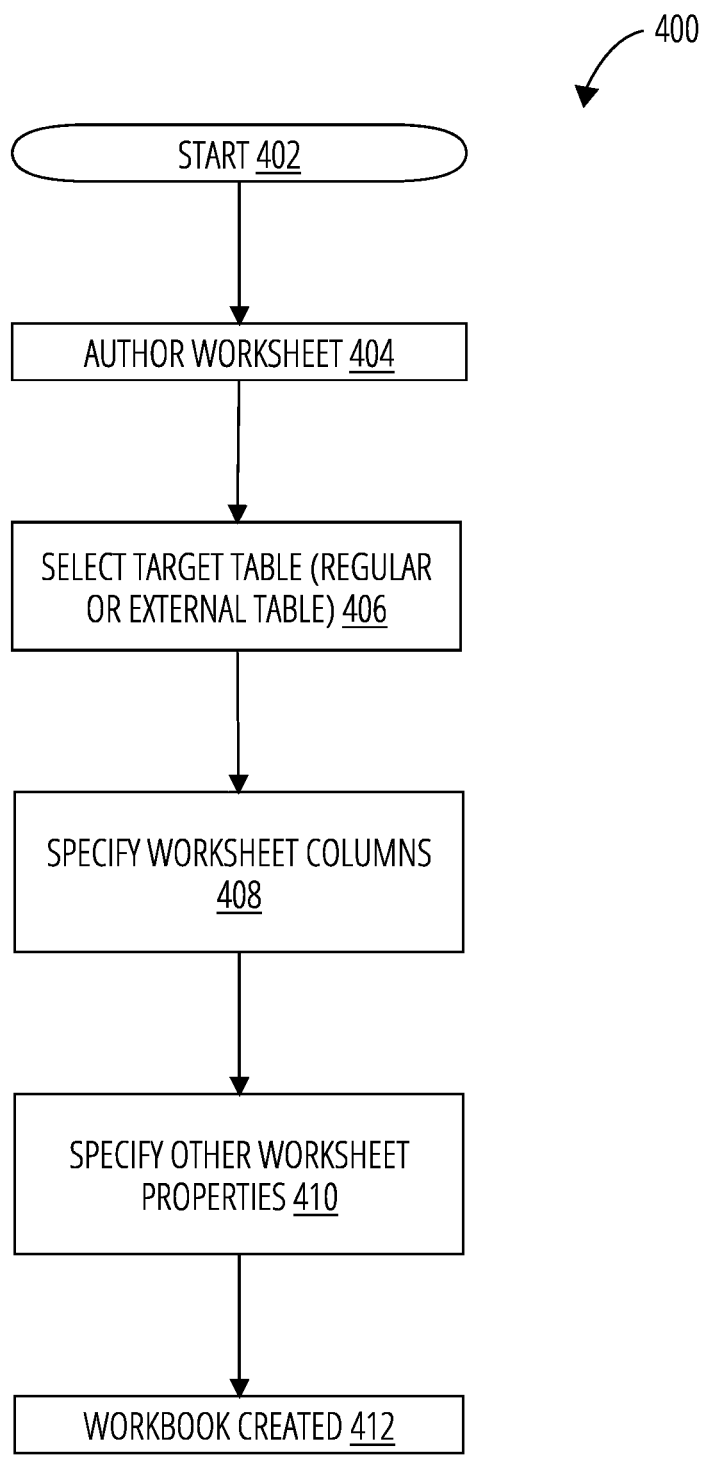
FIG. 4 illustrates a block diagram for authoring a workbook in accordance with one embodiment.

FIG. 4 illustrates a block diagram 400 for authoring a workbook in accordance with one embodiment.

First, a worksheet is authored at block 404. A target table is then selected at block 406. The target table may be a regular table or an external table, as described in FIG. 3. Once the target table is selected, worksheet columns are specified at block 408. Other worksheet properties can be specified at block 410. This leads to the creation of a workbook at block 412. From the perspective of a user, an external table behaves like a regular table. That is, from an applications layer, there is no difference between an external table and a regular table. Thus, from a user perspective, a creation of a workbook from an external table looks exactly the same as creation of a workbook from a regular table.

Figure 5:
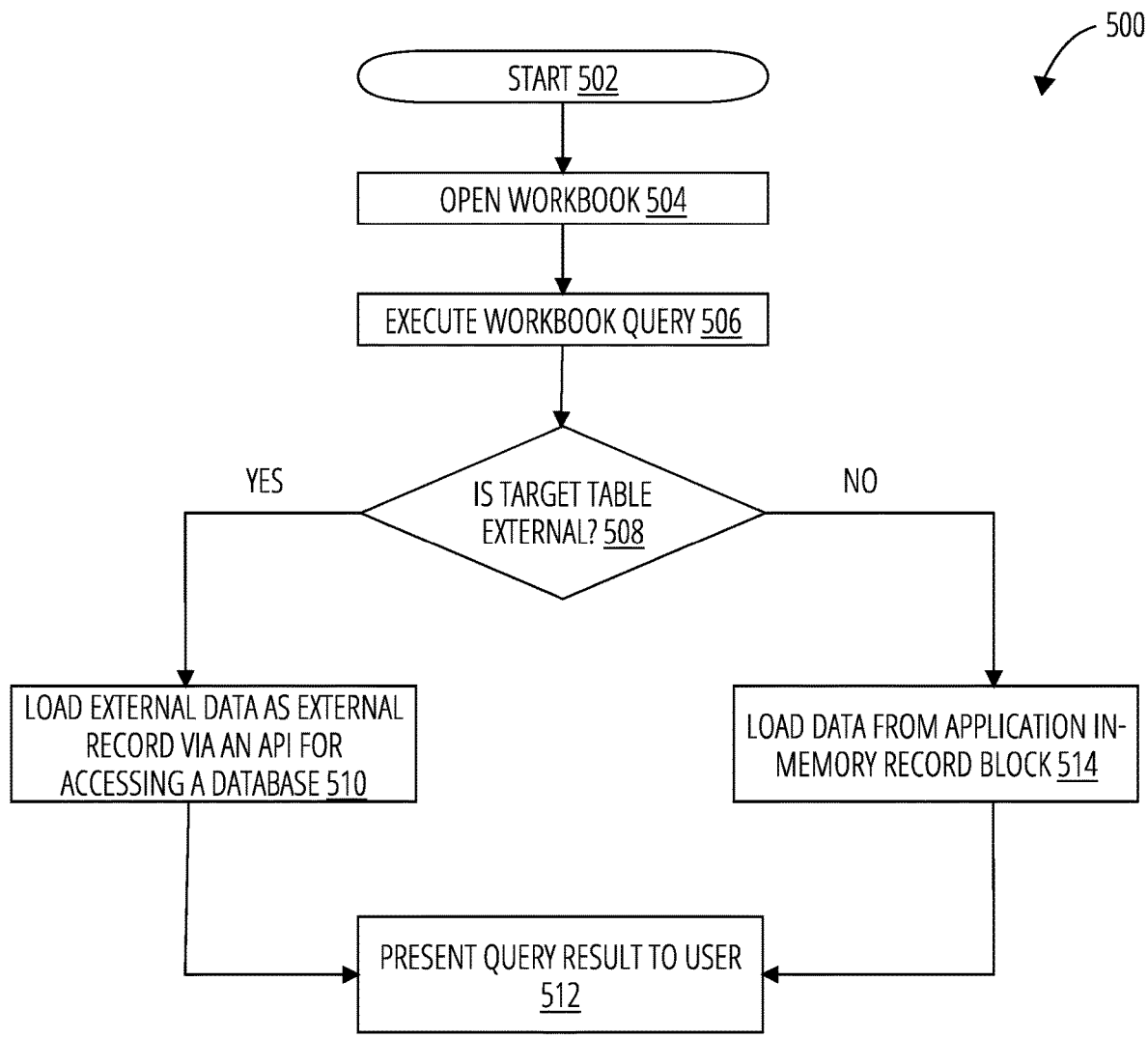
FIG. 5 illustrates a block diagram in accordance with one embodiment.

FIG. 5 illustrates a block diagram 500 for executing a workbook, in accordance with one embodiment.

A workbook is opened at block 504 by a user, after which a workbook query is executed at block 506. Further details of executing the workbook query at block 506, are discussed in FIG. 6. If a target table of the query is external ('yes' at decision block 508), then external data is loaded as an external record via an API for accessing a database, at block 510. An example of such an API interface is Open Database Connectivity (ODBC). If the target table is not external ('no' at decision block 508), that means the table is in the in-memory database. Data is then loaded from the application in-memory record block at block 514. Regardless of the pathway, a query result is presented to the user at block 512. As results are returned, a composite worksheet can be created that includes records from both the in-memory database (222 in FIG. 2) and the external table (204 in FIG. 2). As discussed below, different operations such as aggregation, filtering and join can be executed while extracting the results.

In FIG. 5, data is accessed in the form of a workbook, as a workbook comprises worksheets, which in turn is based on records. That is, a workbook is a type of format used in a presentation layer. However, any resource that is based on one or more records, can be used in the presentation layer.

Figure 6:
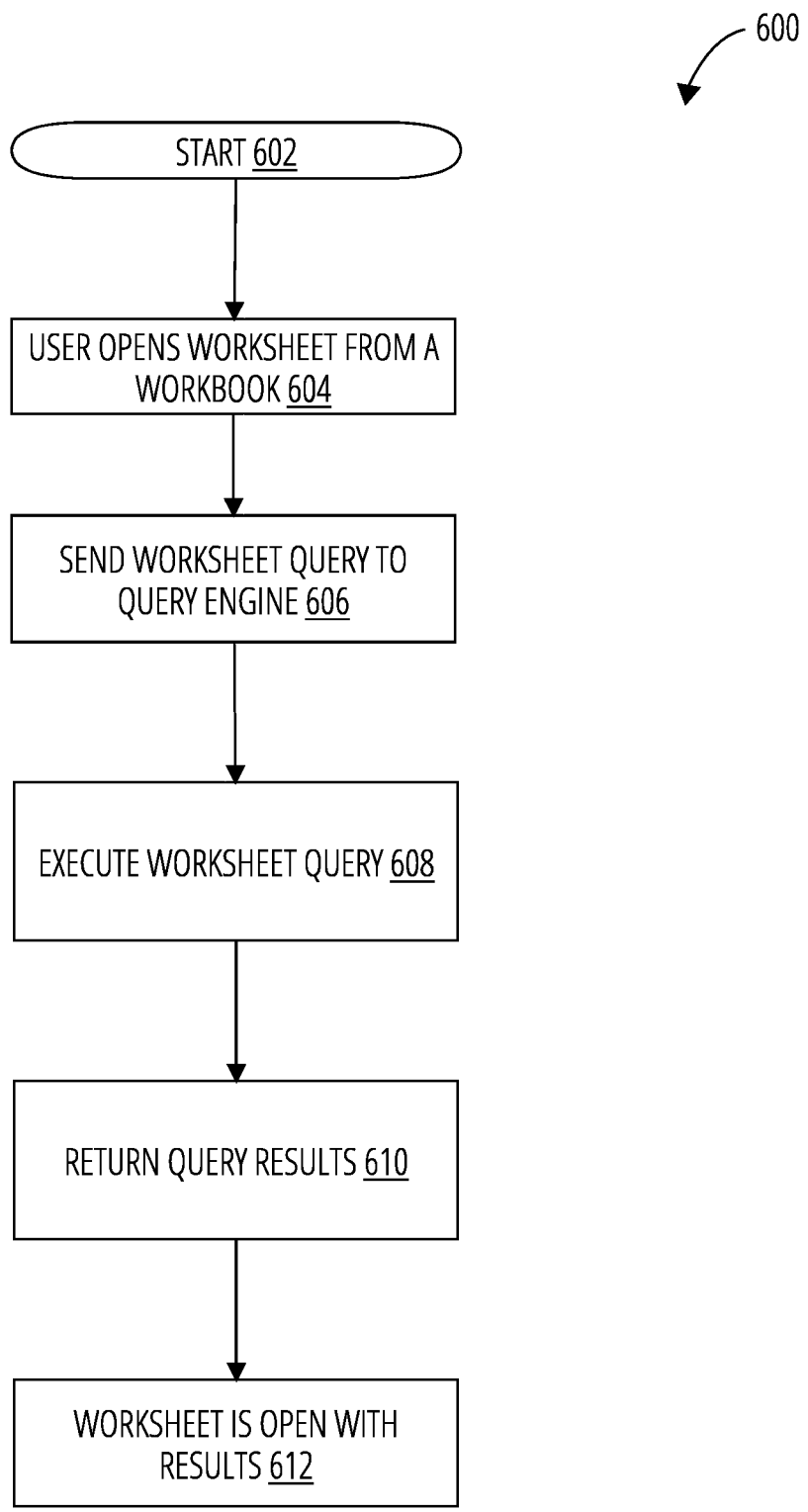
FIG. 6 illustrates a block diagram for executing a workbook query in accordance with one embodiment.

FIG. 6 illustrates a block diagram 600 for executing a workbook query in accordance with one embodiment. FIG. 6 applies to both a regular table and an external table, and describes a process that starts from a front end all the way to a back end. After a user opens a worksheet from a workbook at block 604, a worksheet query is sent to a query engine a block 606 in order to obtain data. The worksheet query is then executed at block 608. The query results are then returned at block 610. The worksheet is opened with the query results at block 612; that is, retrieved data is displayed (via a user interface) in the worksheet. While the general process summarized in FIG. 6 applies to both a regular table and an external table, the execution of the worksheet query at block 608 differs, depending on whether the table is regular or external. Further details regarding execution of a worksheet query (block 608) for an external table are discussed in FIG. 7.

Figure 7:
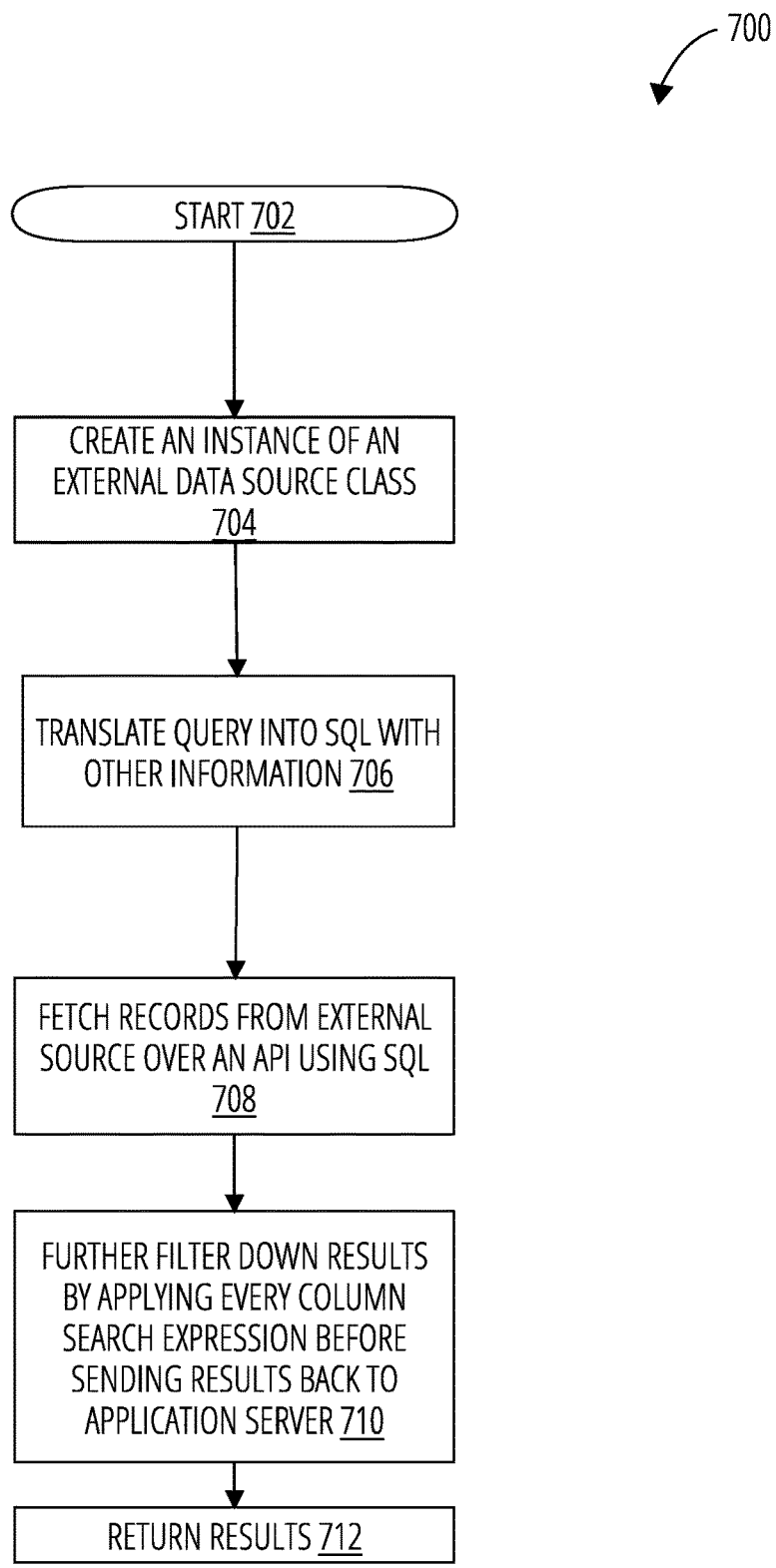
FIG. 7 illustrates a block diagram for execution of a query of an external table in accordance with one embodiment.

FIG. 7 illustrates a block diagram 700 for execution of a query of an external table in accordance with one embodiment.

An instance of an external data source class can be created at block 704. A query may then be translated into SQL along with other information about the table at block 706. This information can include a table name, any filter expressions, aggregation rules, joins and a set of column expressions. Records can then be fetched from an external source via an API (for accessing a database) using SQL at block 708. An example of such an API interface is Open Database Connectivity (ODBC). The results can be filtered down further by applying every column search expression before sending results back to an application server, at block 710. The results can then be returned at block 712.

Figure 8:
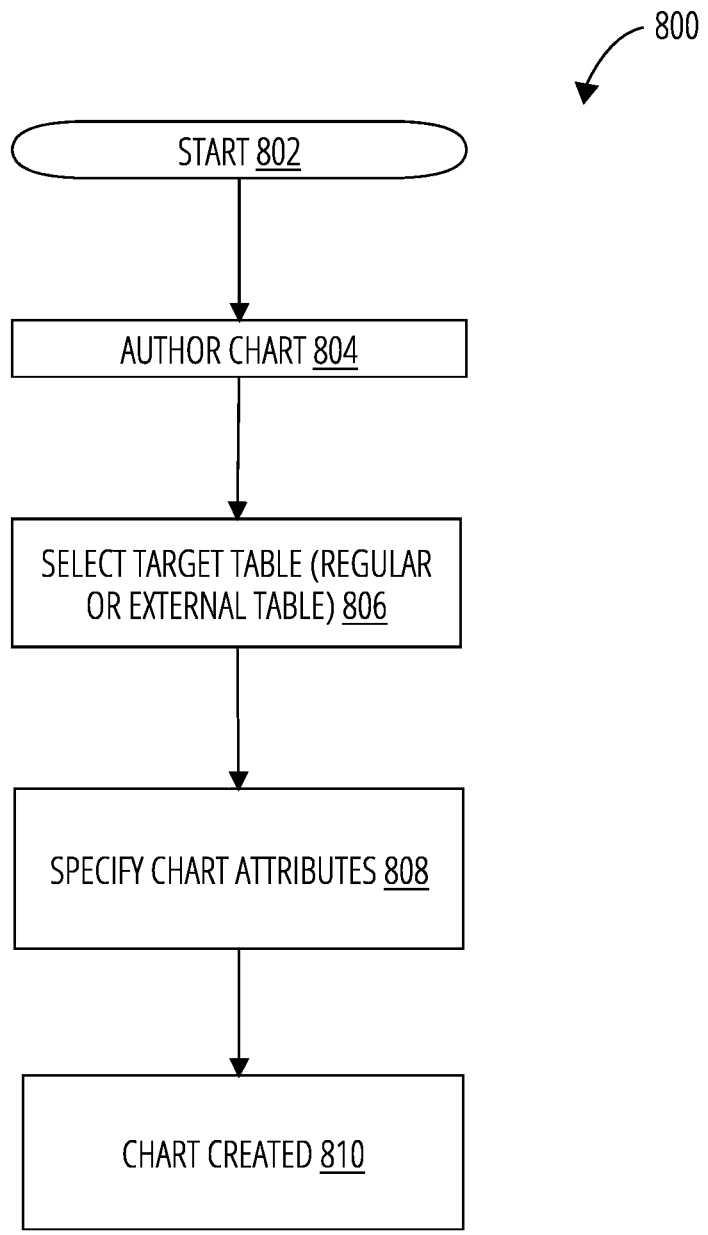
FIG. 8 illustrates a block diagram for authoring a chart in accordance with one embodiment.

FIG. 8 illustrates a block diagram 800 for authoring a chart in accordance with one embodiment.

First, a chart is authored at block 804. A target table is then selected at block 806. The target table may be a regular table or an external table, as described in FIG. 3. Once the target table is selected, chart attributes are specified at block 808. This leads to the creation of a chart at block 810. The chart can be any type of chart, such as, but not limited to: a pie chart, a bar chart, and so on. From the perspective of a user, an external table behaves like a regular table. That is, from an applications layer, there is no difference between an external table and a regular table. Thus, from a user perspective, a creation of a chart from an external table looks exactly the same as creation of a chart from a regular table.

Figure 9:
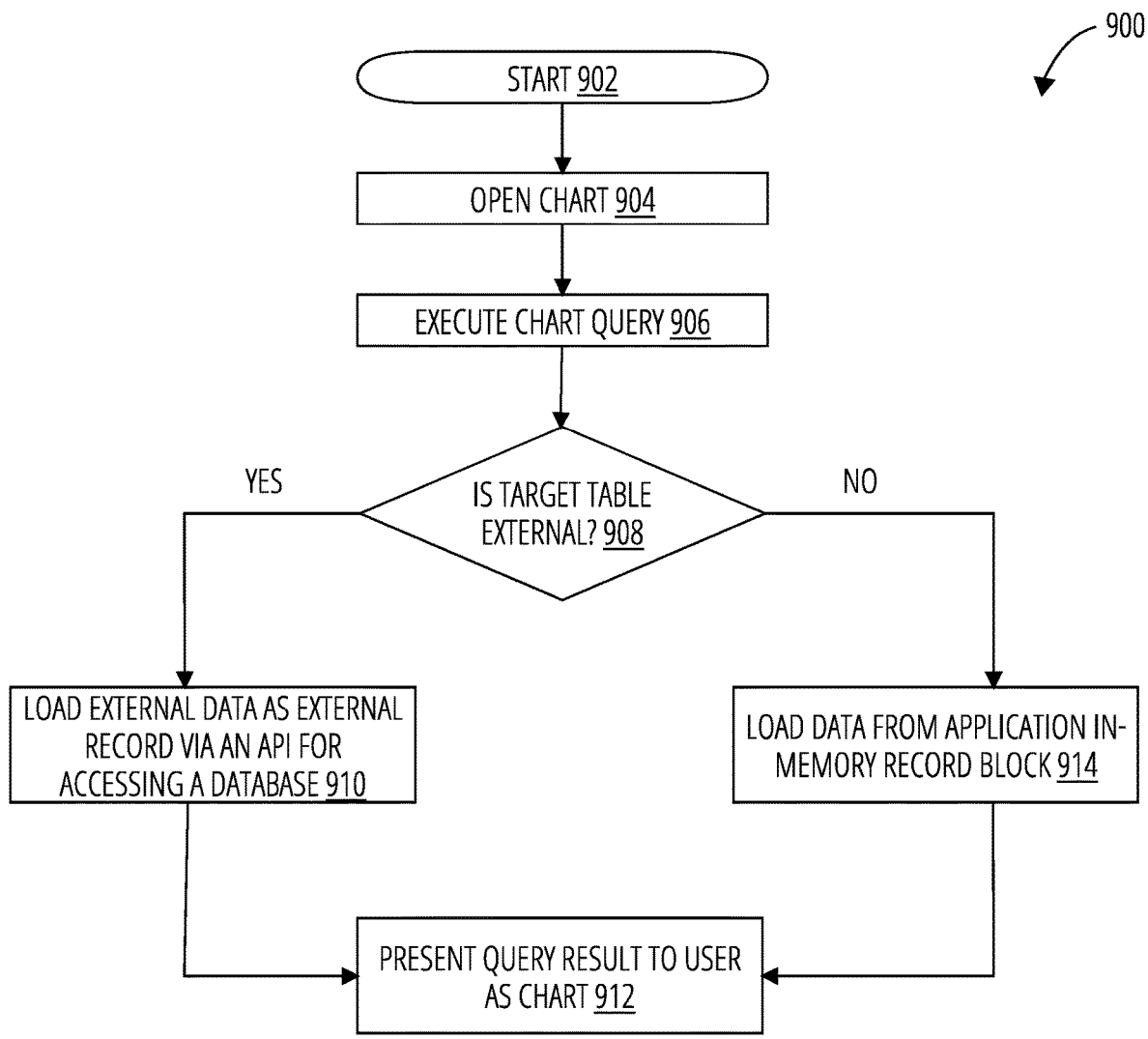
FIG. 9 illustrates a block diagram in accordance with one embodiment.

FIG. 9 illustrates a block diagram 900 for executing a chart, in accordance with one embodiment.

A chart is opened at block 904 by a user, after which a chart query is executed at block 906. Further details of executing the chart query at block 906, are discussed in FIG. 6. If a target table of the query is external ('yes' at decision block 908), then external data is loaded as an external record via an API for accessing a database, at block 910. An example of such an API interface is Open Database Connectivity (ODBC). If the target table is not external ('no' at decision block 908), that means the table is in the in-memory database. Data is then loaded from the application in-memory record block at block 914. Regardless of the pathway, a query result is presented to the user at block 912. As results are returned, a composite chart can be created that includes records from both the in-memory database (222 in FIG. 2) and the external table (204 in FIG. 2).

In FIG. 9, data is accessed in the form of a chart, as a chart is based on records. That is, a chart is a type of format used in a presentation layer. However, any resource that is based on one or more records, can be used in the presentation layer.

Figure 10:
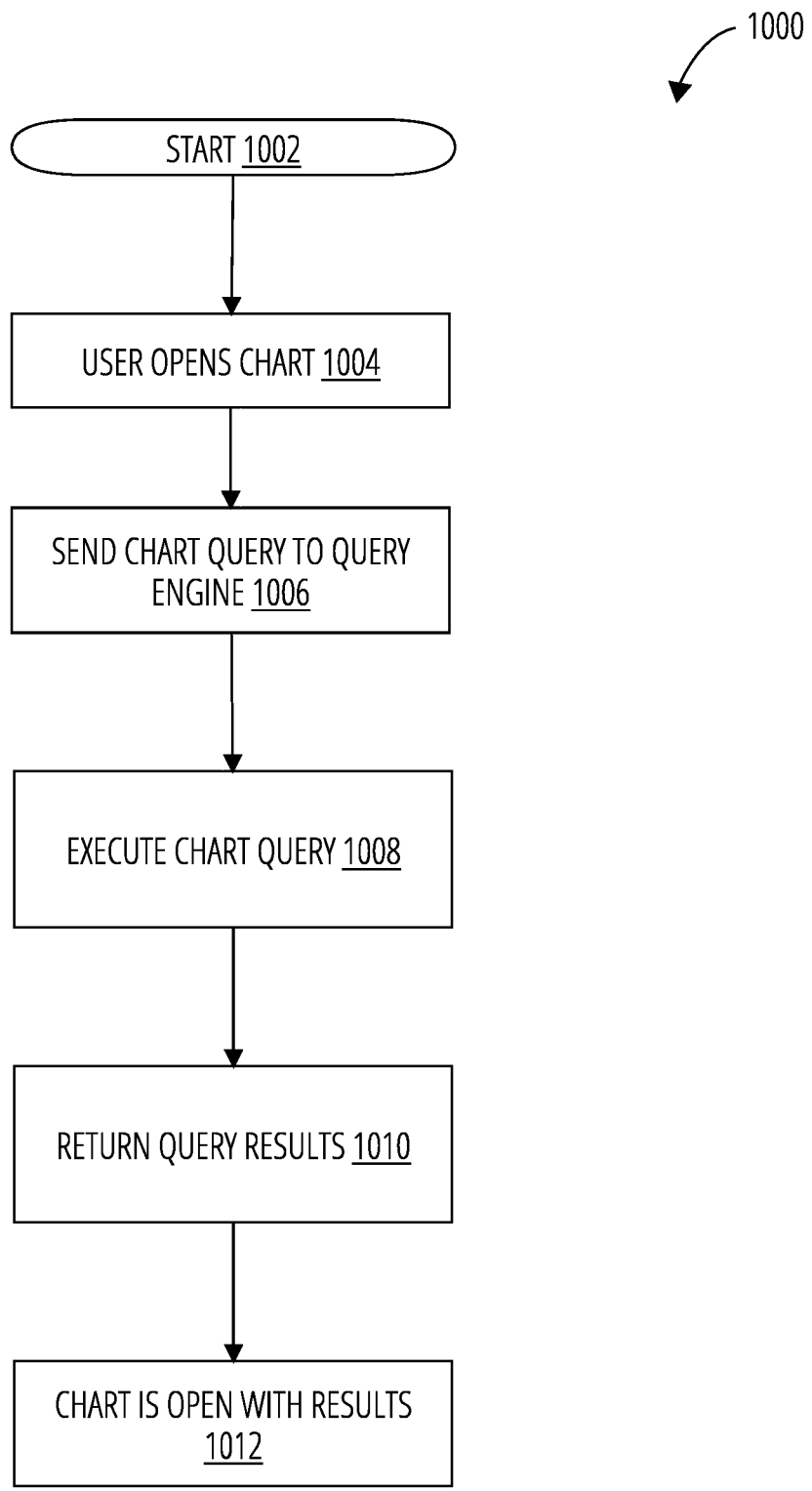
FIG. 10 illustrates a block diagram for executing a chart query in accordance with one embodiment.

FIG. 10 illustrates a block diagram 1000 for executing a chart query in accordance with one embodiment. FIG. 10 applies to both a regular table and an external table, and describes a process that starts from a front end all the way to a back end. After a user opens a chart at block 1004, a chart query is sent to a query engine a block 1006 in order to obtain data. The chart query is then executed at block 1008. The query results are then returned at block 1010. The chart is opened with the query results at block 1012; that is, retrieved data is displayed (via a user interface) in the chart. While the general process summarized in FIG. 10 applies to both a regular table and an external table, the execution of the chart query at block 1008 differs, depending on whether the table is regular or external. Further details regarding execution of a chart query (block 1008) for an external table are discussed in FIG. 11.

Figure 11:
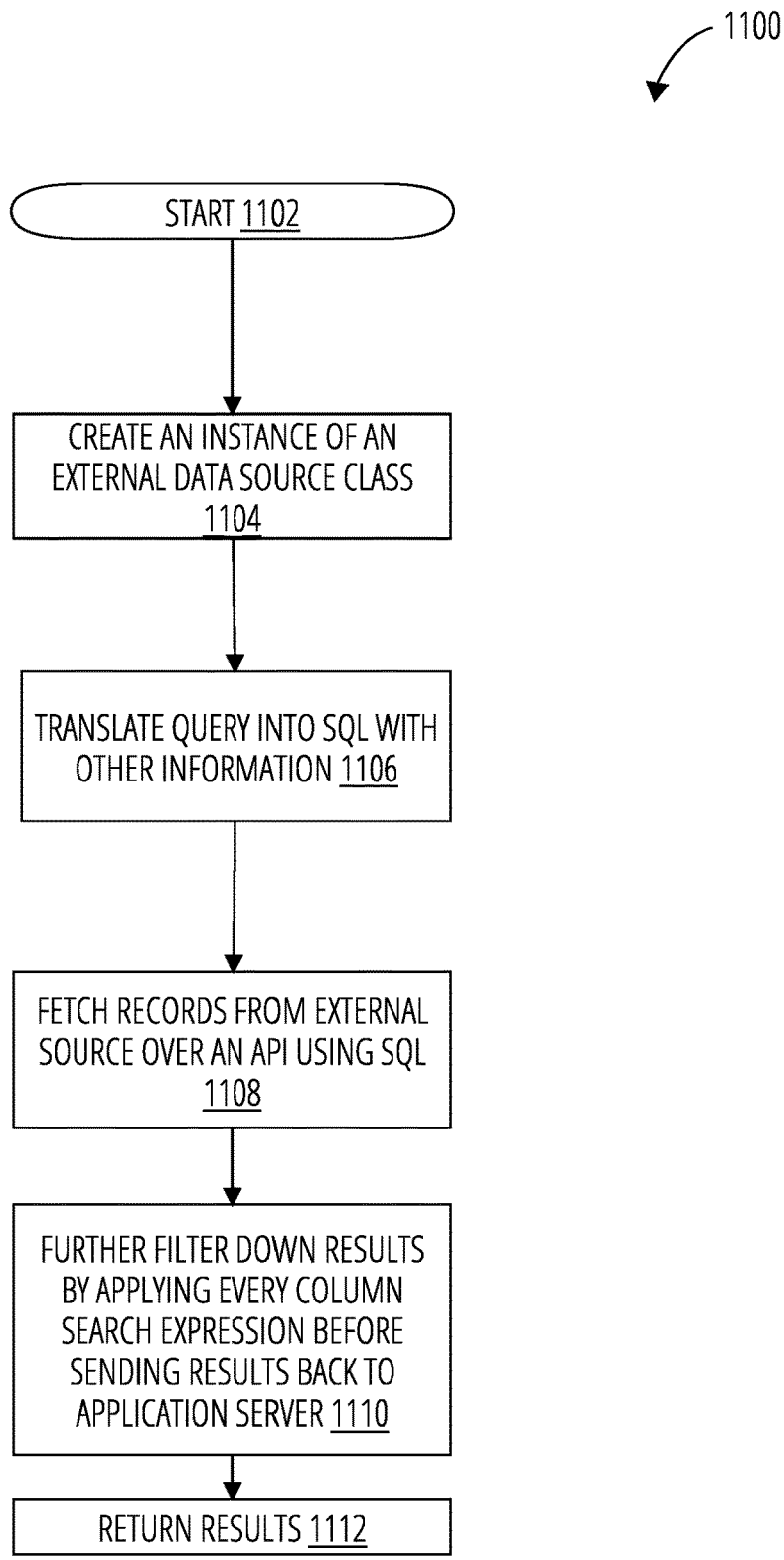
FIG. 11 illustrates a block diagram for execution of a query of an external table in accordance with one embodiment.

FIG. 11 illustrates a block diagram 1100 for execution of a query of an external table in accordance with one embodiment.

An instance of an external data source class can be created at block 1104. A query may then be translated into SQL along with other information about the table at block 1106. This information can include a table name, any filter expressions, aggregation rules, joins and a set of column expressions. Records can then be fetched from an external source via an API (for accessing a database) using SQL at block 1108. An example of such an API interface is Open Database Connectivity (ODBC). The results can be filtered down further by applying every column search expression before sending results back to an application server, at block 1110. The results can then be returned at block 1112.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
opening, by a processor, a chart;
executing, by the processor, a chart query on the chart, the chart query having a target table, wherein executing the chart query comprises:
sending, by the processor, the chart query to a query engine;
executing, by the processor, the chart query; and
returning, by the processor, one or more query results;
loading, by the processor and based on the one or more query results, external data from an external data source to a record that is external to an in-memory database, for a target table that is an external table;
loading, by the processor and based on the one or more query results, data from a record block stored in the in-memory database, for a target table that is a regular table; and
creating, by the processor, a composite chart comprising the loaded external data and the loaded data from the record block.

2. The computer-implemented method of claim 1, wherein loading the external data from the external data source comprises:
using, by the processor, an Application Programming Interface (API) for accessing a database.

3. The computer-implemented method of claim 1, wherein the external data source is at least one of a public cloud, an external system and an external disk.

4. The computer-implemented method of claim 1, wherein executing the chart query for the external table comprises:
creating, by the processor, an instance of an external data source class;
translating, by the processor, the chart query into Structured Query Language (SQL);
fetching, by the processor, one or more records from the external data source over an API using SQL;
filtering, by the processor, results by applying one or more column search expressions; and
sending, by the processor, the results to an application server.

5. A computing apparatus comprising:
a processor; and
a memory storing instructions that, when executed by the processor, configure the apparatus to:
open, by the processor, a chart;
execute, by the processor, a chart query on the chart, the chart query having a target table, wherein executing the chart query further configures the apparatus to:
send, by the processor, the chart query to a query engine;
execute, by the processor, the chart query; and
return, by the processor, one or more query results;
load, by the processor and based on the one or more query results, external data from an external data source to a record that is external to an in-memory database, for a target table that is an external table;
load, by the processor and based on the one or more query results, data from a record block stored in the in-memory database, for a target table that is a regular table; and
create, by the processor, a composite chart comprising the loaded external data and the loaded data from the record block.

6. The computing apparatus of claim 5, wherein when loading the external data from the external data source, the apparatus is configured to:
use, by the processor, an Application Programming Interface for accessing a database.

7. The computing apparatus of claim 5, wherein the external data source is at least one of a public cloud, an external system and an external disk.

8. The computing apparatus of claim 5, wherein when executing the chart query for the external table, the apparatus is configured to:
create, by the processor, an instance of an external data source class;
translate, by the processor, the chart query into Structured Query Language (SQL);
fetch, by the processor, one or more records from the external data source over an API using SQL;
filter, by the processor, results by applying one or more column search expressions; and
send, by the processor, the results to an application server.

9. A non-transitory computer-readable storage medium, the computer-readable storage medium including instructions that when executed by a computer, cause the computer to:
open, by a processor, a chart;
execute, by the processor, a chart query on the chart, the chart query having a target table, wherein executing the chart query further comprises configuring the computer to:
send, by the processor, the chart query to a query engine;
execute, by the processor, the chart query; and
return, by the processor, one or more query results;
load, by the processor and based on the one or more query results, external data from an external data source to a record that is external to an in-memory database, for a target table that is an external table;
load, by the processor and based on the one or more query results, data from a record block stored in the in-memory database, for a target table that is a regular table; and
create, by the processor, a composite chart comprising the loaded external data and the loaded data from the record block.

10. The computer-readable storage medium of claim 9, wherein loading the external data from the external data source comprises:
using, by the processor, an Application Programming Interface (API) for accessing a database.

11. The computer-readable storage medium of claim 9, wherein the external data source is at least one of a public cloud, an external system and an external disk.

12. The computer-readable storage medium of claim 9, wherein executing the chart query for the external table comprises:
- create, by the processor, an instance of an external data source class;
- translate, by the processor, the chart query into Structured Query Language (SQL);
- fetch, by the processor, one or more records from the external data source over an API using SQL;
- filter, by the processor, results by applying one or more column search expressions; and
- send, by the processor, the results to an application server.

* * * * *